(12) United States Patent
Zhang et al.

(10) Patent No.: US 10,007,501 B1
(45) Date of Patent: Jun. 26, 2018

(54) METHOD OF DEPLOYING APPLICATIONS RAPIDLY BASED ON CUSTOMIZED ANDROID PLATFORM

(71) Applicant: CENTRAL SOUTH UNIVERSITY, Changsha (CN)

(72) Inventors: Yaoxue Zhang, Changsha (CN); Shaoyong Li, Changsha (CN); Yaping Liu, Changsha (CN); Haining Liao, Changsha (CN); Ning Hu, Changsha (CN)

(73) Assignee: CENTRAL SOUTH UNIVERSITY, Changsha (CN)

( * ) Notice: Subject to any disclaimer, the term of this patent is extended or adjusted under 35 U.S.C. 154(b) by 0 days. days.

(21) Appl. No.: 15/666,577

(22) Filed: Aug. 2, 2017

(30) Foreign Application Priority Data

May 19, 2017 (CN) .......................... 2017 1 0357945

(51) Int. Cl.
*G06F 9/445* (2018.01)
*H04L 29/08* (2006.01)
*G06F 8/61* (2018.01)

(52) U.S. Cl.
CPC ................ *G06F 8/61* (2013.01); *H04L 67/34* (2013.01)

(58) Field of Classification Search
CPC .................................. G06F 8/61; H04L 67/34
USPC ........................................................ 717/175
See application file for complete search history.

(56) References Cited

U.S. PATENT DOCUMENTS

| 2015/0288702 | A1* | 10/2015 | Choe | H04L 63/102 726/1 |
| 2016/0224321 | A1* | 8/2016 | Seshadri | G06F 8/30 |
| 2016/0335454 | A1* | 11/2016 | Choe | G06Q 30/018 |
| 2016/0378462 | A1* | 12/2016 | Hu | H04L 67/34 717/173 |
| 2017/0102929 | A1* | 4/2017 | Lee | G06F 8/61 |

OTHER PUBLICATIONS

Gavala et al., "Development Platforms for Mobile Applications: Status and Trends", IEEE, 10pg. (Year: 2011).*
Tracy, Kim W., "Mobile application development experiences on Apple's iOS and Android OS", IEEE, 5pg. (Year: 2012).*

* cited by examiner

*Primary Examiner* — Ryan D Coyer
(74) *Attorney, Agent, or Firm* — Gokalp Bayramoglu

(57) ABSTRACT

The present invention discloses a method for rapidly deploying an application based on a customized android platform, and is aimed to solve the problems of long installation time, high energy consumption, a slow system response, and poor user experience when installing an application in a mobile intelligent device running the Android system. The technical solutions are as below: building a system for rapidly deploying an application based on the customized Android platform, wherein the system includes a cloud application store running in a cloud server and an application store client running in a mobile intelligent device; improving the installation process of the application for the Android system, introducing the cloud application store and a store client, and incorporating an optimized target file into the APK file, wherein the optimized target file is needed when the mobile intelligent device runs the application.

5 Claims, 9 Drawing Sheets

| Application identification 1 | Application category identification 1 | Original application installation package 1 | Optimized application installation package list 1 | |
|---|---|---|---|---|
| | | | terminal system attribute code 1 | optimized installation package 1 |
| | | | terminal system attribute code 2 | optimized installation package 2 |
| | | | ...... | ...... |
| | | | terminal system attribute code n | optimized installation package n |
| Application identification 2 | Application category identification 2 | Original application installation package 2 | Optimized application installation package list 2 | |
| | | | terminal system attribute code 1 | optimized installation package 1 |
| | | | terminal system attribute code 2 | optimized installation package 2 |
| | | | ...... | ...... |
| | | | terminal system attribute code n | optimized installation package n |
| ...... | ...... | ...... | ...... | |
| Application identification P | Application category identification M | Original application installation package P | Optimized application installation package list P | |

METHOD OF DEPLOYING APPLICATIONS RAPIDLY BASED ON CUSTOMIZED ANDROID PLATFORM

CROSS REFERENCE TO RELATED APPLICATIONS

This application is based upon and claims priority to Chinese Patent Application No. 201710357945.2 (CN), filed on May 19, 2017, the entire contents of which are incorporated herein by reference.

TECHNICAL FIELD

The present invention relates to the technical field of the mobile intelligent device based on the Android system, particularly relating to a method of rapidly deploying applications based on a customized Android platform.

BACKGROUND

Since Android V4.4, Google started to use the ART (Android runtime) mode in the Android to replace the Dalvik virtual machine. The ART mode runs the Android application programs in the AOT (Ahead-Of-Time) mode, and statically compiles intermediate codes into native codes before running, so as to save conversion time for running JIT (Just-In-Time) each time. However, in order to be compatible with various hardware apparatuses, and thus achieve the purpose of cross-platform running of the Android applications, even with regard to the ART mode which can accelerate the running speed of the application program, it is unnecessary for the developer to directly compile his/her application into object machine codes. The Google original APK installation package is still an APK file (Android Package, i.e., Android application installation files) having Dex bytecodes. The device still needs to perform compiling optimization again when installing the application, to convert the Dex bytecodes into the machine codes, which are stored in the device for running the application.

FIG. 1 is a logical relation diagram of the application installation on the Android system. Being triggered by the user, for example, by clicking, the Google Market in an application layer, the built-in PackageInstaller of the Android system, or other application markets obtains the APK file to be installed, and sends an installation request to PackageManager in a middle layer. The installation request is submitted to PackageManagerService in a service layer in a binder mode (one of inter-process communication modes of the Android system) and processed by PackageManagerService. System service installed is invoked in an internal process communication mode, i.e. socket (referred to as socket internal process communication mode) by PackageManagerService. The installed performs the operations such as detecting a target file, creating the target file, and modifying a user permission of the target file, etc. Finally, the built-in executable program dex2oat or dexopt of Android is invoked by excel to perform an optimized operation of the APK file, and generate the objection file for a final execution.

FIG. 2 is a structure of an original installation package of an application (i.e., original APK file) on the Android system. The Android application is programmed in Java, using the Android SDK (Android Software Development Kit) to compile codes, and all data and resources are packed into an APK file, which is a compressed file with a suffix of ".apk" The APK file includes all the contents of an Android application, and is a file used for installing the application on the Android platform.

The APK file is actually a zip compressed package, including contents as below: an assets directory, used for storing static files that need to be packed into the APK file; lib directory, used for storing the native library files that the application relies on; res directory, used for storing resource files of the application, wherein res is an abbreviation for resource; META-INF directory, used for storing signature information of the application and a signature certificate used in signing the application by the developer, so as to verify the integrity of the APK file; AndroidManifest.xml file, which is a configuration file of the Android application; classes.dex file, which is a specific compiled bytecode file generated when an executable part of the Android application is being packed; resources.arsc file, used for recording a mapping relation between the resource files and resource IDs.

FIG. 3 is a flow chart of an existing method for installing the application on the Android system, and the steps are provided as below:

The first step, triggering an APK installation action of the PackageInstaller by a user, for example, by clicking, etc., and sending an installation request to PackageManager;

The second step, sending the installation request to PackageManagerService in a service layer in a binder mode by the PackageManager;

The third step, after the installation request is received by the PackageManagerService, submitting the installation request to a service process installed in a socket internal process communication mode;

The fourth step, performing an installation and an APK optimization by the installed, wherein the fourth step further includes:

4.1 Executing do_install function, and invoking the "install" function of the Android system to complete operations of copying APK files, creating directoryues, modifying a user permission, etc.

4.2 Executing do_dexopt function, invoking the dexopt function of the Android system to perform the APK optimization, the step 4.2 further includes:

4.2.1 Calculating a path of an optimized target file to be generated according to the parameters sent from the PackageManagerService;

4.2.2 Creating the optimized target file, modifying a user permission to obtain a read-write handle of the optimized target file;

4.2.3 Invoking the built-in executable program dex2oat or dexopt of Android to perform an operation of the APK file optimization, and generating the optimized target file for a final execution;

The fifth step, the method ends.

During the whole application installation process, the step of translating the classes.dex bytecodes in the APK file into optimized bytecodes or machine codes needed for the final execution, i.e., the step 4.2.3 of the flow chart of a method for installing the application on the Android system, consumes the most resources and time. This step occupies most of performance cost during the application installation process, which leads to long installation time of application and a slow system response, and then consequently bad user experience. Those problems are more obvious in mobile intelligent devices with limited resources.

Thus, it is significant and practical for the mobile intelligent devices with limited resources to provide a method for rapidly deploying applications based on the Android platform, so as to rapidly install the applications, save computing resources and reduce energy consumption. In the present invention, the optimized target file (a machine code file of ART virtual machine or the ODEX file of the Dalvik virtual machine) required for the execution in a terminal system is incorporated into the installation package of Android system. Further, in combination with the cloud application store and a store client, a system for rapidly deploying the applications is established, so as to accelerate the application installation process of the Android system. By inquiring patents and patent applications published in China and abroad, there is no published literature related to the research of incorporating the optimized target file for the final execution to accelerate the application installation in the Android system.

SUMMARY OF THE INVENTION

The present invention provides a method of rapidly deploying applications based on a customized Android platform, and is used for solving the problems of long installation time, high energy consumption, a slow system response, and poor user experience when installing an application in a mobile intelligent device running the Android system.

The technical solution of the present invention is as below: improving the installation process of the application for the Android system, introducing the cloud application store and a store client, and incorporating an optimized target file into the APK file, wherein the optimized target file is needed when the mobile intelligent device runs the application. In this technical solution, the most time-consuming and energy-consuming localized compilation step is not required when installing the application, and thus the effect of a rapid installation deployment is achieved.

The present invention includes the specific steps as below:

A first step, building a system for rapidly deploying the application based on the customized Android platform, wherein the system is composed of two layers, including a cloud application store running in a cloud server, and an application store client running in a mobile intelligent device.

A unique cloud application store of the global network is deployed in the cloud server. The cloud application store is composed of an application management module, a machine code integrated module, and a database for the application center (referred to as application center database). The cloud application store provides multiple services in parallel to all the mobile intelligent devices connected to the cloud application store, wherein the services include downloading an application, downloading an application list, uploading an optimized file required when running the application. An application data list is stored in the application center database. The application data list has P items, wherein the P is the number of the applications. Each item of the list has four fields, including an application identification, an application category identification, an original application installation package, and an optimized application installation package list. Wherein, the application identification is a unique identification representing the application itself. The application category identification represents the category of the application, such as social chatting, video playing and picture editing. An original APK file is stored in the original application installation package. The optimized application installation package list is a two-dimensional array. Each row of the optimized application installation package list is composed of two items including an attribute code of a terminal system (referred to as terminal system attribute code) and an optimized installation package. An APK installation file optimized by the mobile intelligent device corresponding to the terminal system attribute code is stored in the optimized installation package. The terminal system attribute code is a unique identification of the type of the mobile intelligent device. The same type of mobile intelligent devices has the same hardware version and system software version, and thus the optimized target file used when finally running the application is applicable to the mobile intelligent devices of the same type. One application identification corresponds to one optimized application installation package list. Each optimized application installation package list has n items, n is the number of types of the mobile intelligent devices connected to the cloud application store; wherein both the P and the n are positive integers.

An application store client runs in each mobile intelligent device. The application store client is composed of an application acquisition module and a machine code uploading module. The application store client is used to show a list of available applications in the application store client, download APK files which support a rapid deployment, and upload optimized target files of the particular applications generated by native compilation.

The application management module is connected to the machine code integrated module, the application acquisition module and the application center database. The application management module is used to provide the application acquisition module with a downloading application list service and a downloading application service, and also provide APK files to the machine code integrated module. A request for obtaining the application installation package sent by the machine code integrated module is received by the application management module (the parameter of the request includes the application identification). The original application installation package corresponding to the application identification is obtained by looking up the application data list, and sent back to the machine code integrated module. A request to add the optimized installation package sent by the machine code integrated module is received by the application management module (the parameters of the request include the application identification, the terminal system attribute code, and the optimized installation package). The optimized application installation package list corresponding to the application identification is obtained by looking up the application data list. The terminal system attribute code and the optimized installation package sent by the machine code integrated module are stored into the optimized application installation package list corresponding to the application identification. A request to download the application list sent by the application acquisition module is also received by the application management module (the parameter of the request includes the application category identification). All the applications which belong to the application category identification are obtained by looking up the application data list to form an application list (including two items: the application identification and the application category identification both in the application data list). The application list is sent back to the application acquisition module. A request to download the application sent by the application acquisition module is also received by the application management module (the parameters of the request include the application identification and the terminal system attribute code). The application original package and the optimized application installation package list which are corresponding to the application identification, are obtained by looking up the application data list, and then the optimized application installation package list is looked up to check whether there is any optimized installation package corresponding to the terminal system attribute code. If the optimized installation package is available, the optimized installation package is sent back to the application acquisition module; otherwise if the optimized installation package is unavailable, the original application installation package is sent back to the application acquisition module.

The machine code integrated module is connected to the application management module and the machine code upload module. The machine code integrated module is used to receive the optimized target file and integrate the optimized target file into the original application installation package, so as to generate the optimized installation package corresponding to the specific terminal system. A request to upload the optimized target file sent by the machine code uploading module is received by the machine code integrated module (the parameters of the request include the application identification, the terminal system attribute code, and the optimized target file), to obtain the optimized target file --- target. file sent by the machine code uploading module. At the same time, a request to get the application package is sent by the machine code integrated module to the application management module (the parameter of the request includes the application identification), to obtain the original application installation package. Subsequently, the optimized target file --- target. file is integrated into the original application installation package and the installation package is resigned to obtain the optimized installation package. A request to add the optimized installation package is sent by the machine code integrated module to the application management module (the parameters of the request include the application identification, the terminal system attribute code, and the optimized installation package), so as to store the optimized installation package into the application data list. The process of integrating the optimized target file --- target. file is the process to store the target. file in the original installation package as shown in FIG. 2. The format of the obtained optimized installation package is shown in FIG. 5, i.e., the target. file is added behind the resources.arsc and then the optimized installation package is packed into a zip compression package.

The application acquisition module is connected to the application management module and the service process installed, and used to show a list of available applications in the cloud application store, wherein the list of available applications is shown on the mobile intelligent device. The application acquisition module is also used to download the application installation package specified by the user from the cloud application store and receive touch and mouse event of the user to trigger the process of application installation. A request to download the application list is sent by the application acquisition module to the application management module (the parameter of the request includes the application category identification), to obtain the application list from the application management module (including two items: the application identification and the application category identification). The application list is shown in the application display list of the mobile intelligent device to provide an interface for the user to download applications. If the user intends to download a certain application, a request to download the application is sent by the application acquisition module to the application management module (the parameters of the request include the application identification and the terminal system attribute code). After the optimized installation package sent back by the application management module is obtained, the application acquisition module sends a request for installing the application to the service process installed through the built-in PackageInstaller of the Android system (the parameter of the request includes the application installation package), the application installation task is then completed.

The machine code uploading module is connected to the machine code integrated module and service process installed, and used to upload the target file compiled by the mobile intelligent device and required when running the application, so that the target file can be shared. Wherein the target file is compiled by the mobile intelligent device. A request to upload the optimized file sent by the installed is received by the machine code uploading module, (the parameters of the request include the application identification and the optimized target file). After the application identification and the optimized target file is received from the installed, a request to upload the optimized target file is sent to the machine code integrated module by the machine code uploading module with the terminal system attribute code corresponding to the mobile intelligent device, (the parameters of the request include the application identification, the terminal system attribute code, and the optimized target file), so as to upload the optimized target file required when running the application.

The second step, improving the service process installed of the Android system.

The improved service process installed is connected to the application acquisition module and the machine code upload module, enhancing the support to the optimized installation package based on conducting the original service process installed on the Android to realize rapid installation deployment. Its modification method is (Compared to the original application installation process, see the fourth step in FIG. 6):

2.1 Changing an optimized file generation process of the original installeddaemon process. After creating the optimized target file, changing a permission, and obtaining a read-write handle of the optimized target file in the step 4.2.2, the improved installed would not directly perform the native compilation process, instead, step M1 is performed to determine whether the APK file to be installed is the available optimized installation package. If yes, performing step M2 (using the APK file to perform a rapid installation, and then ends); if not, performing step 4.2.3 to invoke an built-in executable program of the Android to optimize the APK file, so as to generate an optimized target file for a final execution.

2.2 Changing the application installation ending process of the original installed. After invoking the built-in executable program of the Android to optimize the APK file so as to generate the optimized target file for the final execution, the improved installed performs step M3 first to send a request for uploading the optimized target file to the machine code uploading module (the parameters of the request are the application identification and the optimized target file), and then upload the optimized target file. The installation process subsequently ends.

The third step, running the cloud application store, and initializing the application center database. The system administrator logs the relevant contents of the applications provided for the user into the application data list of the application center database through the application management module, wherein the contents include the application identification, the application category identification, and the original application installation package. As to the optimized application installation packages which are compiled according to terminal type and uploaded and packed by the user, the system administrator also stores the optimized application installation packages in the optimized application installation package list through the application management module, wherein the optimized application installation package list corresponds to the application identification, and the optimized application installation package list belongs to application data list.

The fourth step, the mobile intelligent devices deploy applications in parallel, by means of the system for rapidly deploying applications based on a customized Android platform. The fourth step includes:

4.1 If the mobile intelligent devices run normally, downloading the application list provided from the cloud application store regularly, by the application acquisition module according to the method described in step 4.1.1, while receiving the operating instructions from the user according to the method described in step 4.1.2 by the application acquisition module, and operating according to different instructions.

4.1.1 By means of a built-in timer of the Android system, sending a request for downloading the application list to the application management module regularly by the application acquisition module (generally set as per day or per hour, and self-defined by the user according to the energy consumption and the data flow of the mobile intelligent device); displaying the application list obtained from the application management module on the mobile intelligent device to provide a downloading interface of the application for the user.

4.1.2 According to the application list displayed on the mobile intelligent device, receiving the operations of the user from the keyboard or the touch screen by the application acquisition module, wherein if the application installation is needed, then turn to step 4.2, otherwise if no application installation is needed, then turn to step 4.1.2.

4.2 Sending a request for downloading the application to the application management module by the application acquisition module (the parameters of the request include the application identification and the terminal system attribute code).

4.3 Sending the application installation package to the application acquisition module by the application management module. This step includes: Receiving the request for downloading the application from the application acquisition module by the application management module (the parameters of the request include the application identification and the terminal system attribute code); looking up the application data list to obtain the original application installation package and the optimized installation package list, which both correspond to the application identification; subsequently, looking up the optimized application installation package list to check whether the optimized installation package corresponding to the terminal system attribute code is available; if the optimized installation package is available, sending the optimized installation package back to the application acquisition module, otherwise if the optimized installation package is unavailable, sending the original application installation package to the application acquisition module.

4.4 By means of triggering APK installation action of the PackageInstaller, sending an installation request to the PackgeManager by the application acquisition module, (the parameter of the request includes the application installation package to be installed, i.e., the AKP file to be installed);

4.5 Sending the installation request to the PackageManagerService in the service layer by the PackageManager in a binder manner.

4.6 After the installation request is received by PackageManagerService, submitting an installation request to the improved service process installed in a socket internal process communication mode;

4.7 Performing installation and APK optimization by the improved service process installed, this step including:

4.7.1 Executing do_install function, and invoking the "install" function of the Android system, to complete operations of copying APK files, creating directoryues, modifying a user permission, etc.

4.7.2 Executing do_dexopt function, invoking the dexopt function of the Android system to perform APK optimization, and this step includes:

4.7.2.1 Calculating a path of the optimized target file to be generated according to the parameters sent from PackageManagerService.

4.7.2.2 Creating the optimized target file, and modifying a user permission to obtain a read-write handle of the optimized target file;

4.7.2.3 Judging whether the application installation package to be installed sent by the application acquisition module in step 4.4 is the available optimized installation package, and if yes, turn to step 4.7.2.4, while if not, turn to step 4.7.2.5 to perform the native compilation;

4.7.2.4 Performing a rapid installation, including: decompressing the application installation package to be installed by the installed to obtain the optimized target file---target-.file, and saving the target.file into a designated file through the read-write handle obtained from step 4.7.2.2. Subsequently, turning to step 4.11.

4.7.2.5 Invoking a built-in executable program dex2oat or dexopt of the Android to perform the APK file optimization, so as to generate the optimized target file to be used for the final execution, and thus the process for installing the application natively is completed.

4.7.3 Sending a request for uploading the optimized file to the machine code uploading module by the installed.

4.8 After receiving the request for uploading the optimized file sent from the installed by the machine code uploading module, sending a request for uploading the optimized target file to the machine code integrated module, so that the optimized target file required when running the application is uploaded.

4.9 Receiving the optimized target file by the machine code integrated module to generate the optimized installation package, and sending a request for adding the optimized installation package to the application management module. This step includes: receiving the request for uploading the optimized file sent from the machine code uploading module by the machine code integrated module, to obtain the optimized target file sent from the machine code uploading module; meanwhile, sending a request for obtaining the application installation package to the application management module, to obtain the original application installation package; subsequently, integrating the optimized target file-target.file into the original application installation package and resigning the original application installation package to obtain the optimized installation package; and sending a request for adding the optimized installation package to the application management module.

4.10 Storing the optimized installation package into the application data list by the application management module. This step includes: receiving the request for adding the optimized installation package sent from the machine code integrated module by the application management module, looking up the application data list to obtain the optimized application installation package list corresponding to the application identification, and then storing the terminal system attribute code and the optimized installation package sent from the machine code integrated module into the optimized application installation package list.

4.11 Completing the installation application task, and turning to step 4.1.

The present invention can be used to achieve the technical effects as below:

1. The service process installed of the Android system is improved in the second step of the present invention, and the APK package format and application installation process of the Android system, in turn, are further improved in the fourth step. By incorporating the optimized target file required for execution in a terminal system, the installation speed can be increased effectively while the compatibility of the application installation package is guaranteed.

2. The general service mode of the application store is improved in the fourth step of the present invention. The terminal system attribute code is carried by a store client, in this manner, a request for application installation package is sent to the application store. According to the terminal system attribute code, the improved installation packages corresponding to different versions of devices are provided by application store to improve the targeted store service.

3. The solution to share the optimized target file among devices is provided in the fourth step of the present invention. Through the cooperation between the service process installed and the store client, the optimized target file complied by the terminal system is uploaded to the cloud application store, so as to generate an improved installation package corresponding to this terminal. Hence, a more wide and rapid installation effect can be achieved.

BRIEF DESCRIPTION OF THE DRAWINGS

FIG. 4 is a schematic diagram of the application data list of the present invention.

DETAILED DESCRIPTION OF THE EMBODIMENTS

FIG. 4 is a schematic diagram of the application data list of the present invention. The application data list has P items, wherein the P is the number of the applications. Each item of the list has four fields, including an application identification, an application category identification, an original application installation package, and an optimized application installation package list. Wherein, the application identification is a unique identification representing the application itself. The application category identification represents the category of the application, such as social chatting, video playing and picture editing. An original APK file is stored in the original application installation package. The optimized application installation package list is a two-dimensional array. Each row of the optimized application installation package list is composed of two items including an attribute code of a terminal system (referred to as terminal system attribute code) and an optimized installation package. An APK installation file optimized by the mobile intelligent device corresponding to the terminal system attribute code is stored in the optimized installation package. The terminal system attribute code is a unique identification of the type of the mobile intelligent device. The same type of mobile intelligent devices has the same hardware version and system software version, and thus the optimized target file used when finally running the application is applicable to the mobile intelligent devices of the same type. One application identification corresponds to one optimized application installation package list. Each optimized application installation package list has n items, n is the number of types of the mobile intelligent devices connected to the cloud application store; wherein both the P and the n are positive integers.

Figure 5:
FIG. 5 is a structure chart of the optimized installation package (i.e., optimized APK file) of the present invention.

FIG. 5 is a structure chart of the optimized application installation package (i.e., optimized APK file) of the present invention. Similar to the original application installation package described in the background section, the optimized installation package is a compressed file with a suffix of .apk. Compared to the original application installation package, one more item is added in the optimized installation package, i.e., the optimized target file---target.file.

Figure 3:
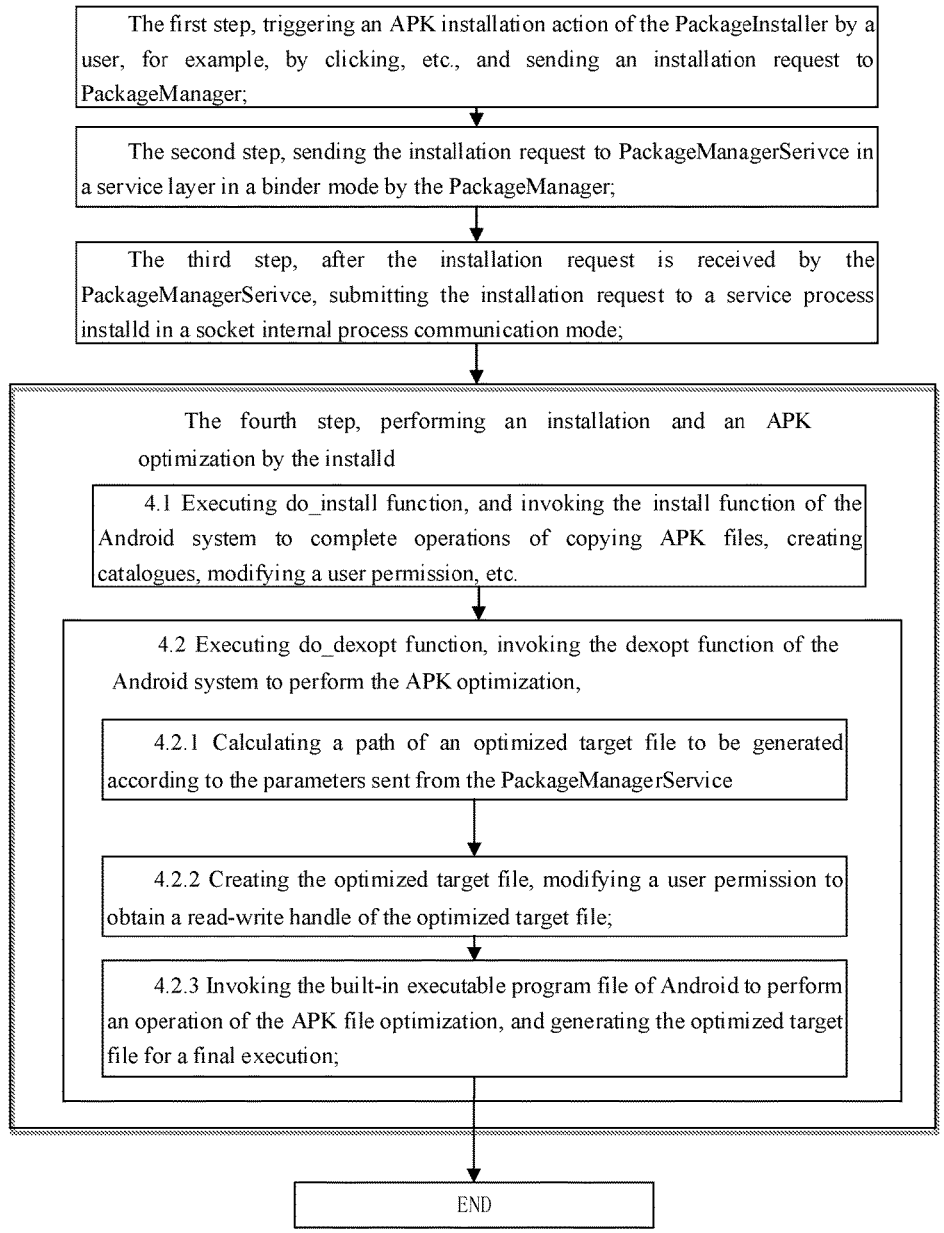
FIG. 3 is a flow chart of the application installation of the Android system in the prior art.
Figure 6:
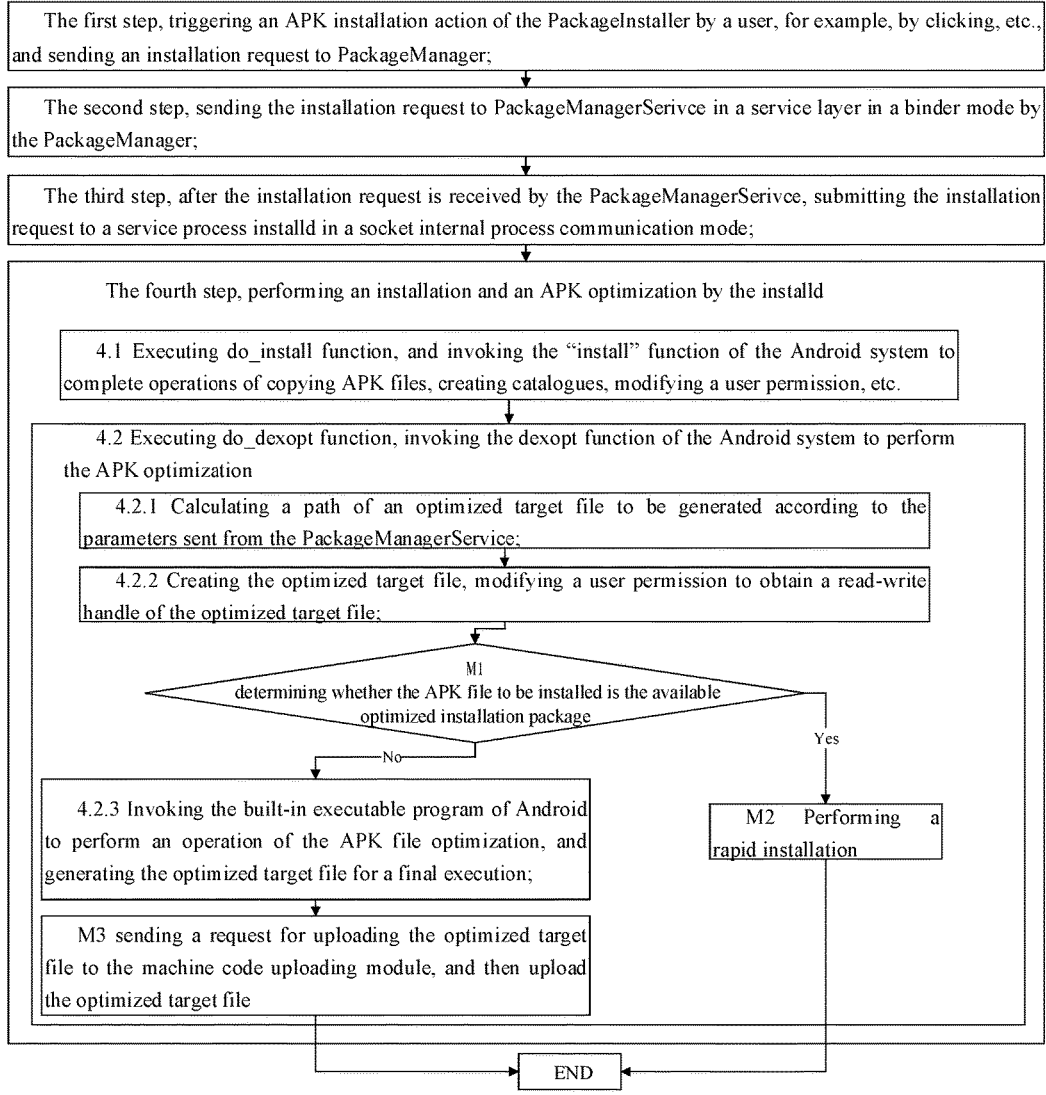
FIG. 6 is a flow chart of the application installation of the present invention, using the improved service process installed, in comparison with the FIG. 3.

FIG. 6 is a flow chart of the application installation of the present invention, using the improved service process installed, in comparison with the FIG. 3. Compared to the flow chart of installing the original application as shown in FIG. 3, the new application installation process is changed as below:

2.1 Changing an optimized file generation process of the original installeddaemon process. After creating the optimized target file, changing a permission, and obtaining a read-write handle of the optimized target file in the step 4.2.2, the improved installed would not directly perform the native compilation process, instead, step M1 is performed to determine whether the APK file to be installed is the available optimized installation package. If yes, performing step M2 (using the APK file to perform a rapid installation, and then ends); if not, performing step 4.2.3 to invoke an built-in executable program of the Android to optimize the APK file, so as to generate an optimized target file for a final execution.

2.2 Changing the application installation ending process of the original installed. After invoking the built-in executable program of the Android to optimize the APK file so as to generate the optimized target file for the final execution, the improved installed performs step M3 first to send a request for uploading the optimized target file to the machine code uploading module (the parameters of the request are the application identification and the optimized target file), and then upload the optimized target file. The installation process subsequently ends.

Figure 1:
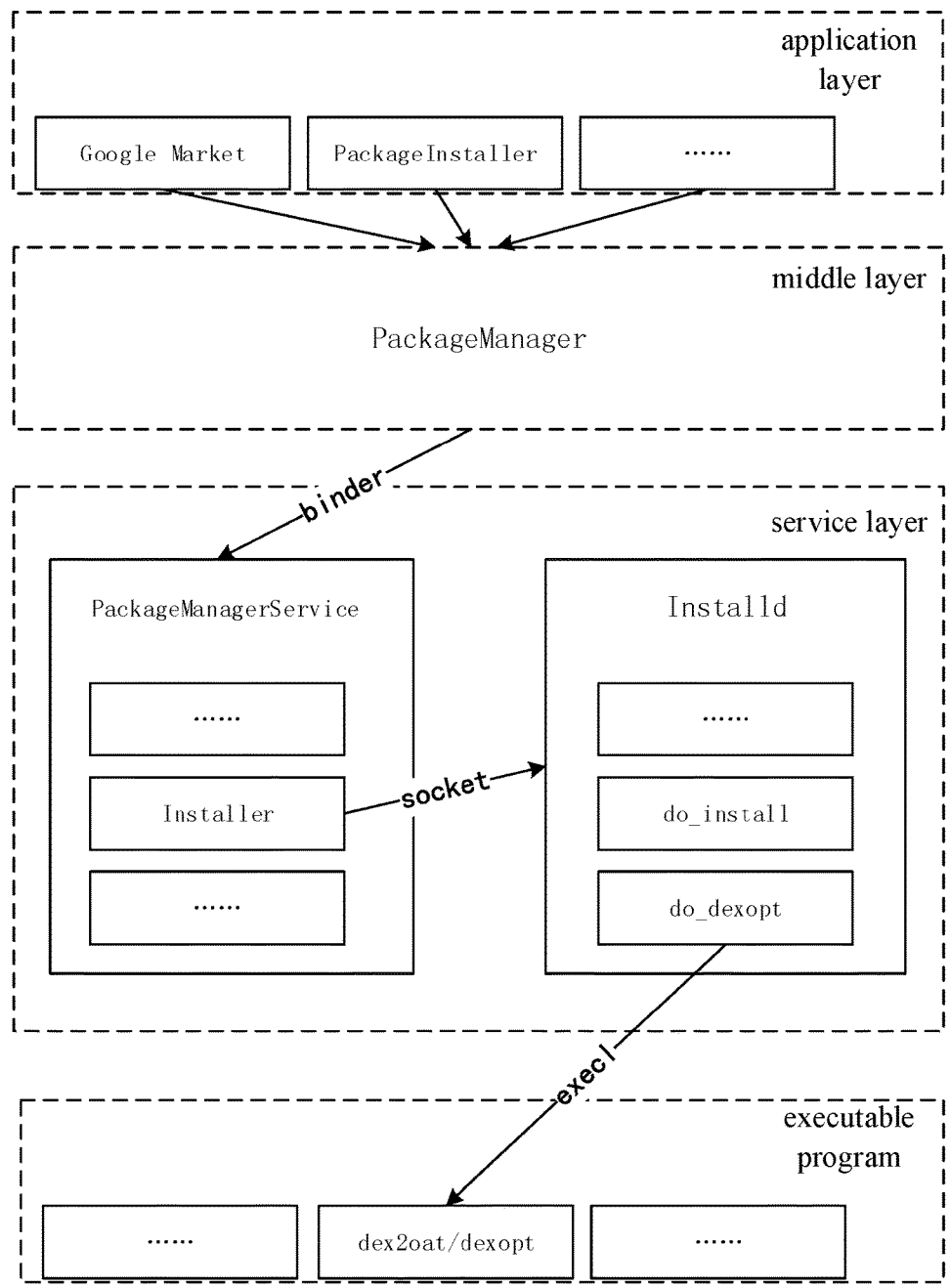
FIG. 1 is a logical relation diagram of the application installation of the Android system in the prior art.
Figure 7:
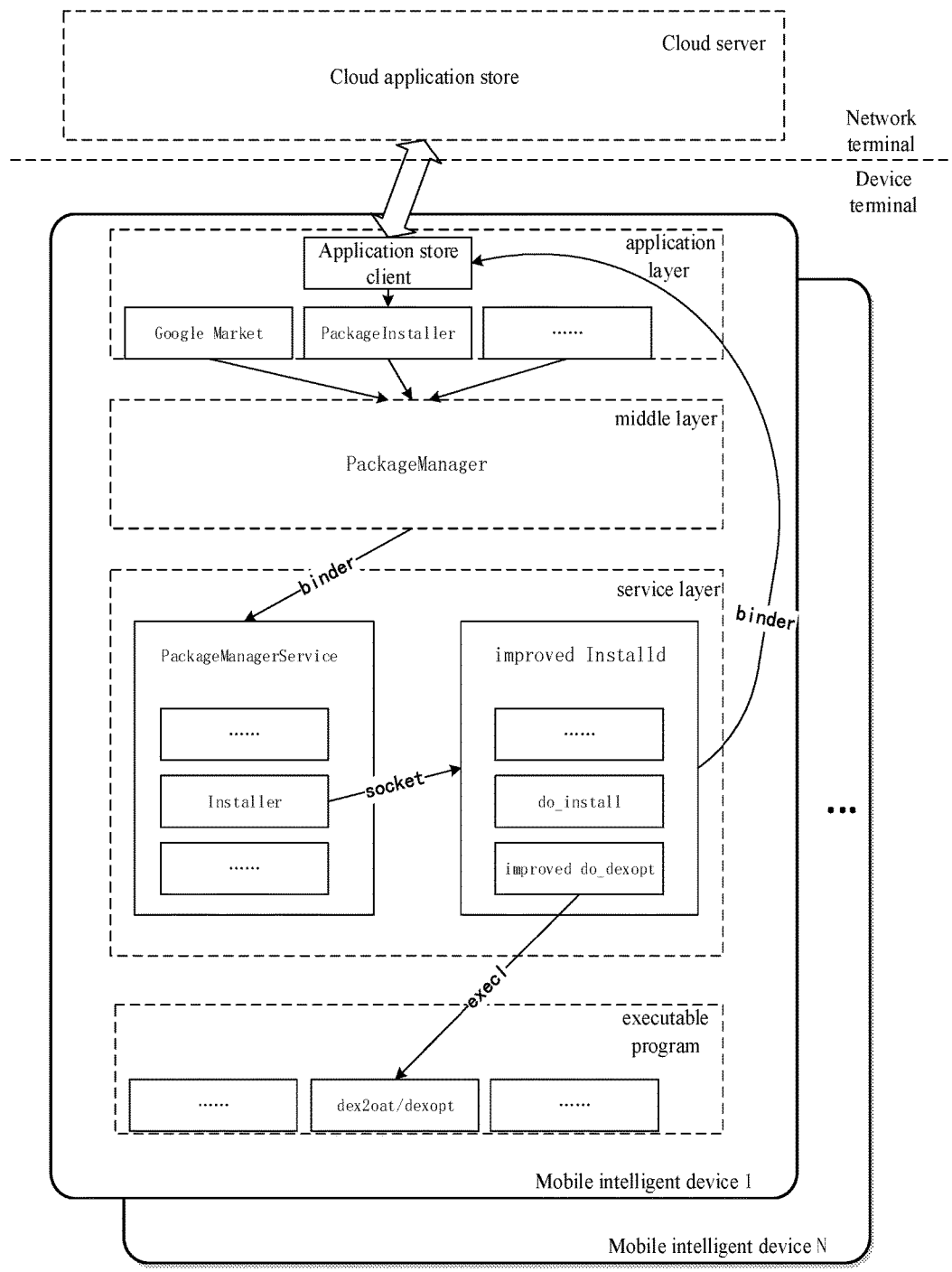
FIG. 7 is a general structure diagram of a system for rapidly deploying an application based on a customized Android platform, wherein the system is built in the first step of the present invention.

FIG. 7 is a general structure diagram of a system for rapidly deploying an application based on a customized Android platform, wherein the system is built in the first step of the present invention. Compared to FIG. 1, the cloud application store and application store client are introduced to improve the service process installed.

Wherein the cloud application store is located on a server side, while the application store client and installed run in the mobile intelligent device. The cloud application store is mainly used to provide the APK installation package which supports a rapid deployment. The application store client is used to show the available application list of the cloud application store, download the APK file which supports the rapid deployment, and upload the optimized target file of a particular application generated by native compilation according to the user settings. The improved installed is used to support the apk installation file with the built-in optimized target file, so that the rapid installation deployment is realized.

Figure 8:
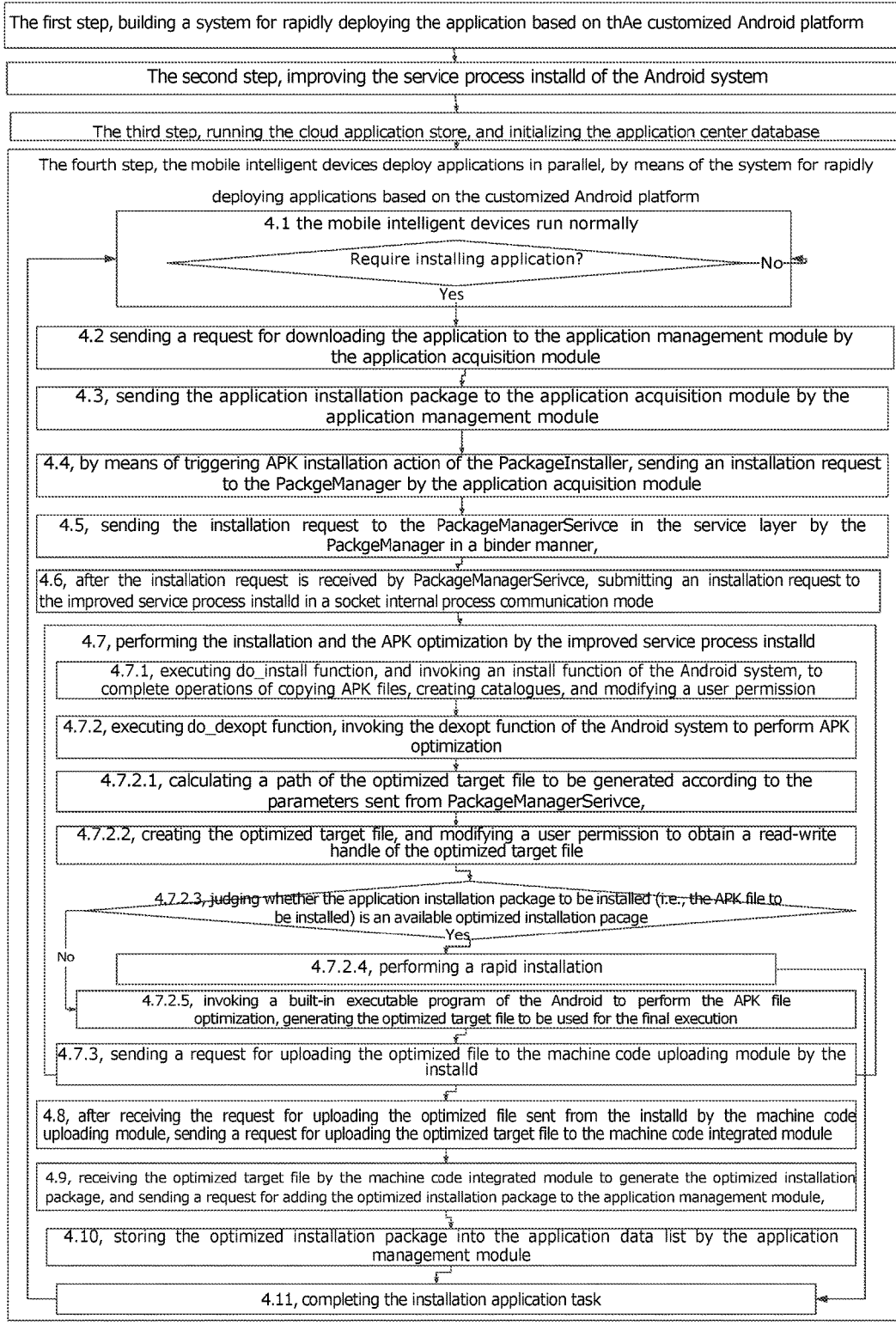
FIG. 8 is a general flow chart of the present invention.

FIG. 8 is a general flow chart of the present invention. The present invention includes the steps as below:

The first step, building a system for rapidly deploying an application based on the customized Android platform. The system is composed of two layers: one is a cloud application store running in a cloud server, the other one is an application store client running in a mobile intelligent device.

Figure 9:
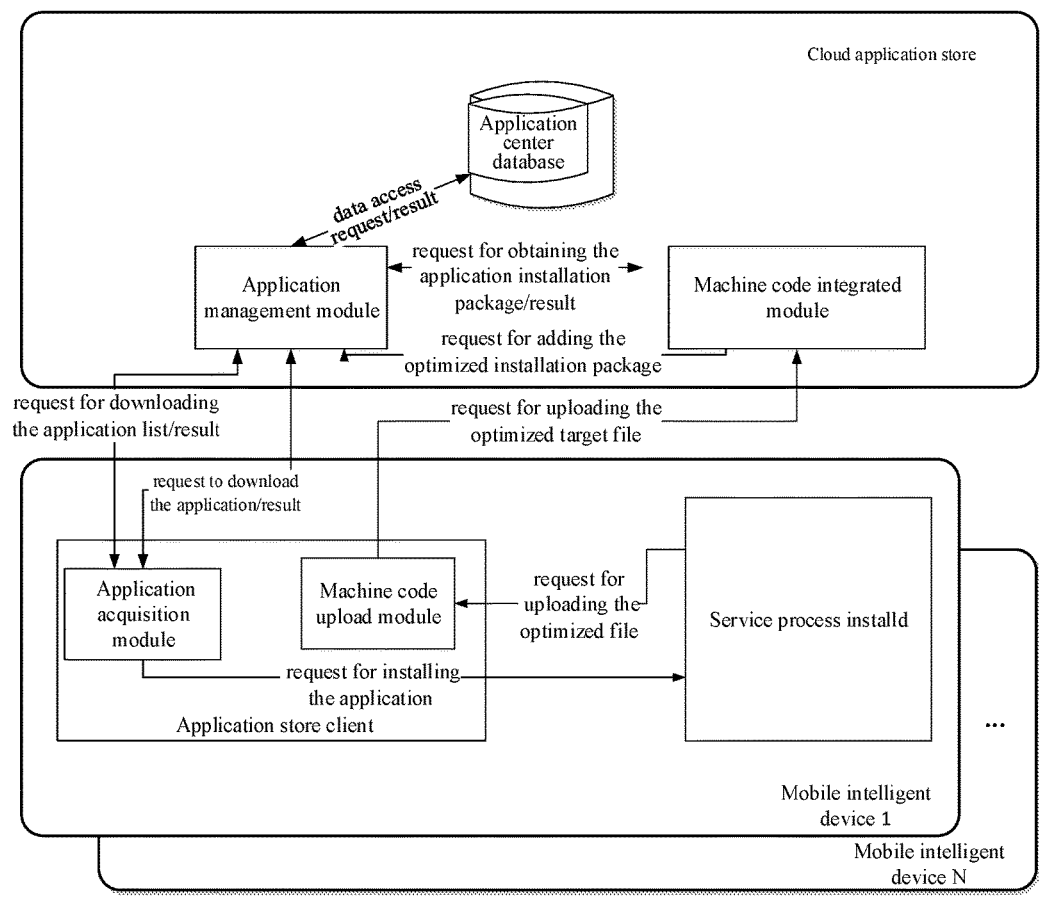
FIG. 9 is a logical relation diagram of the software in the system for rapidly deploying an application based on a customized Android platform, wherein the system is built in the first step of the present invention.

FIG. 9 is a logical relation diagram of the software in the system for rapidly deploying an application based on a customized Android platform, wherein the system is built in the first step of the present invention. As shown in FIG. 9, a unique cloud application store of the global network is deployed in the cloud server. The cloud application store is composed of an application management module, a machine code integrated module, and a database for the application center (referred to as application center database). The cloud application store provides multiple services in parallel to all the mobile intelligent devices connected to the cloud application store, wherein the services include downloading an application, downloading an application list, uploading an optimized file required when running the application. An application data list is stored in the application center database.

An application store client runs in each mobile intelligent device. The application store client is composed of an application acquisition module and a machine code uploading module. The application store client is used to show a list of available applications in the application store client, download APK files which support a rapid deployment, and upload optimized target files of the particular applications generated by native compilation.

The application management module is connected to the machine code integrated module, the application acquisition module and the application center database. The application management module is used to provide the application acquisition module with a downloading application list service and a downloading application service, and also provide APK files to the machine code integrated module. A request for obtaining the application installation package sent by the machine code integrated module is received by the application management module (the parameter of the request includes the application identification). The original application installation package corresponding to the application identification is obtained by looking up the application data list, and sent back to the machine code integrated module. A request to add the optimized installation package sent by the machine code integrated module is received by the application management module (the parameters of the request include the application identification, the terminal system attribute code, and the optimized installation package). The optimized application installation package list corresponding to the application identification is obtained by looking up the application data list. The terminal system attribute code and the optimized installation package sent by the machine code integrated module are stored into the optimized application installation package list corresponding to the application identification. A request to download the application list sent by the application acquisition module is also received by the application management module (the parameter of the request includes the application category identification). All the applications which belong to the application category identification are obtained by looking up the application data list to form an application list (including two items: the application identification and the application category identification both in the application data list). The application list is sent back to the application acquisition module. A request to download the application sent by the application acquisition module is also received by the application management module (the parameters of the request include the application identification and the terminal system attribute code). The application original package and the optimized application installation package list which are corresponding to the application identification, are obtained by looking up the application data list, and then the optimized application installation package list is looked up to check whether there is any optimized installation package corresponding to the terminal system attribute code. If the optimized installation package is available, the optimized installation package is sent back to the application acquisition module; otherwise, if the optimized installation package is unavailable, the original application installation package is sent back to the application acquisition module.

Figure 2:
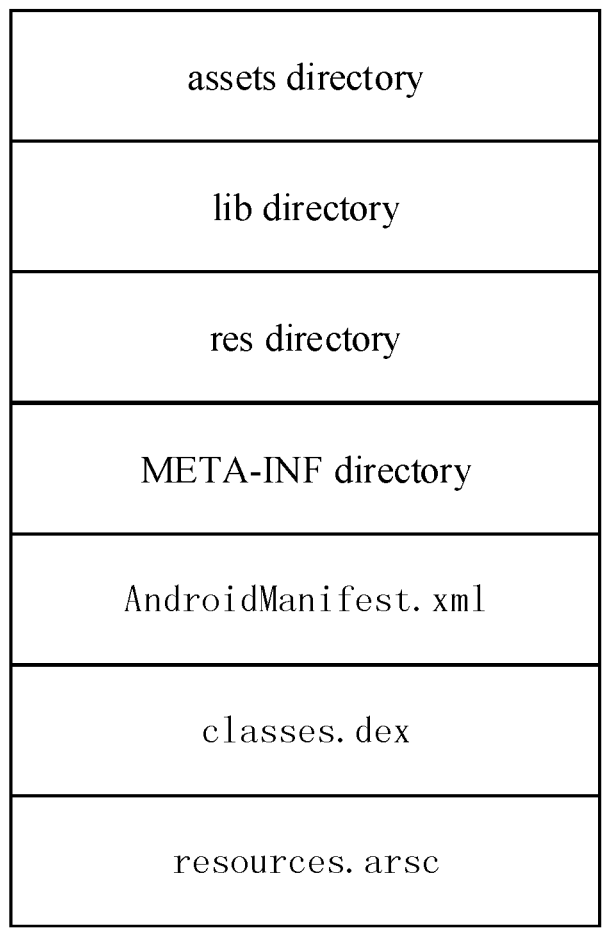
FIG. 2 is a structure chart of the original installation package of the application (i.e., original APK file) on the Android system.

The machine code integrated module is connected to the application management module and the machine code upload module. The machine code integrated module is used to receive the optimized target file and integrate the optimized target file into the original application installation package, so as to generate the optimized installation package corresponding to the specific terminal system. A request to upload the optimized target file sent by the machine code uploading module is received by the machine code integrated module (the parameters of the request include the application identification, the terminal system attribute code, and the optimized target file), to obtain the optimized target file --- target. file sent by the machine code uploading module. At the same time, a request to get the application package is sent by the machine code integrated module to the application management module (the parameter of the request includes the application identification), to obtain the original application installation package. Subsequently, the optimized target file --- target.file is integrated into the original application installation package and the installation package is resigned to obtain the optimized installation package. A request to add the optimized installation package is sent by the machine code integrated module to the application management module (the parameters of the request include the application identification, the terminal system attribute code, and the optimized installation package), so as to store the optimized installation package into the application data list. The process of integrating the optimized target file --- target.file is the process to store the target. file in the original installation package as shown in FIG. 2. The format of the obtained optimized installation package is shown in FIG. 5, i.e., the target.file is added behind the resources.arsc and then the optimized installation package is packed into a zip compression package.

The application acquisition module is connected to the application management module and the service process installed, and used to show a list of available applications in the cloud application store, wherein the list of available applications is shown on the mobile intelligent device. The application acquisition module is also used to download the application installation package specified by the user from the cloud application store and receive touch and mouse event of the user to trigger the process of application installation. A request to download the application list is sent by the application acquisition module to the application management module (the parameter of the request includes the application category identification), to obtain the application list from the application management module (including two items: the application identification and the application category identification). The application list is shown in the application display list of the mobile intelligent device to provide an interface for the user to download applications. If the user intends to download a certain application, a request to download the application is sent by the application acquisition module to the application management module (the parameters of the request include the application identification and the terminal system attribute code). After the optimized installation package sent back by the application management module is obtained, the application acquisition module sends a request for installing the application to the service process installed through the built-in PackageInstaller of the Android system (the parameter of the request includes the application installation package), the application installation task is then completed.

The machine code uploading module is connected to the machine code integrated module and service process installed, and used to upload the target file compiled by the mobile intelligent device and required when running the application, so that the target file can be shared. Wherein the target file is compiled by the mobile intelligent device. A request to upload the optimized file sent by the installed is received by the machine code uploading module, (the parameters of the request include the application identification and the optimized target file). After the application identification and the optimized target file is received from the installed, a request to upload the optimized target file is sent to the machine code integrated module by the machine code uploading module with the terminal system attribute code corresponding to the mobile intelligent device, (the parameters of the request include the application identification, the terminal system attribute code, and the optimized target file), so as to upload the optimized target file required when running the application.

The second step, improving the service process installed of the Android system.

The third step, running the cloud application store, and initializing the application center database. The system administrator logs the relevant contents of the applications provided for the user into the application data list of the application center database through the application management module, wherein the contents include the application identification, the application category identification, and the original application installation package. As to the optimized application installation packages which are compiled according to terminal type and uploaded and packed by the user, the system administrator also stores the optimized application installation packages in the optimized application installation package list through the application management module, wherein the optimized application installation package list corresponds to the application identification, and the optimized application installation package list belongs to application data list.

The fourth step, the mobile intelligent devices deploy applications in parallel, by means of the system for rapidly deploying applications based on a customized Android platform. The fourth step includes:

4.1 If the mobile intelligent devices run normally, downloading the application list provided from the cloud application store regularly, by the application acquisition module according to the method described in step 4.1.1, while receiving the operating instructions from the user according to the method described in step 4.1.2 by the application acquisition module, and operating according to different instructions.

4.1.1 By means of a built-in timer of the Android system, sending a request for downloading the application list to the application management module regularly by the application acquisition module (generally set as per day or per hour, and self-defined by the user according to the energy consumption and the data flow of the mobile intelligent device); displaying the application list obtained from the application management module on the mobile intelligent device to provide a downloading interface of the application for the user.

4.1.2 According to the application list displayed on the mobile intelligent device. receiving the operations of the user from the keyboard or the touch screen by the application acquisition module, wherein if the application installation is needed, then turn to step 4.2, otherwise if no application installation is needed, then turn to step 4.1.2.

4.2 Sending a request for downloading the application to the application management module by the application acquisition module (the parameters of the request include the application identification and the terminal system attribute code).

4.3 Sending the application installation package to the application acquisition module by the application management module. This step includes: Receiving the request for downloading the application from the application acquisition module by the application management module (the parameters of the request include the application identification and the terminal system attribute code); looking up the application data list to obtain the original application installation package and the optimized installation package list, which both correspond to the application identification; subsequently, looking up the optimized application installation package list to check whether the optimized installation package corresponding to the terminal system attribute code is available; if the optimized installation package is available, sending the optimized installation package back to the application acquisition module, otherwise if the optimized installation package is unavailable, sending the original application installation package to the application acquisition module.

4.4 By means of triggering APK installation action of the PackageInstaller, sending an installation request to the PackgeManager by the application acquisition module, (the parameter of the request includes the application installation package to be installed, i.e., the AKP file to be installed);

4.5 Sending the installation request to the PackageManagerService in the service layer by the PackgeManager in a binder manner.

4.6 After the installation request is received by PackageManagerService, submitting an installation request to the improved service process installed in a socket internal process communication mode;

4.7 Performing installation and APK optimization by the improved service process installed, this step including:

4.7.1 Executing do_install function, and invoking the "install" function of the Android system, to complete operations of copying APK files, creating directoryues, modifying a user permission, etc.

4.7.2 Executing do_dexopt function, invoking the dexopt function of the Android system to perform APK optimization, and this step includes:

4.7.2.1 Calculating a path of the optimized target file to be generated according to the parameters sent from PackageManagerService.

4.7.2.2 Creating the optimized target file, and modifying a user permission to obtain a read-write handle of the optimized target file;

4.7.2.3 Judging whether the application installation package to be installed sent by the application acquisition module in step 4.4 is the available optimized installation package, and if yes, turn to step 4.7.2.4, while if not, turn to step 4.7.2.5 to perform the native compilation;

4.7.2.4 Performing a rapid installation, including: decompressing the application installation package to be installed by the installed to obtain the optimized target file-target.file, and saving the target.file into a designated file through the read-write handle obtained from step 4.7.2.2. Subsequently, turning to step 4.11.

4.7.2.5 Invoking a built-in executable program dex2oat or dexopt of the Android to perform the APK file optimization, so as to generate the optimized target file to be used for the final execution, and thus the process for installing the application natively is completed.

4.7.3 Sending a request for uploading the optimized file to the machine code uploading module by the installed.

4.8 After receiving the request for uploading the optimized file sent from the installed by the machine code uploading module, sending a request for uploading the optimized target file to the machine code integrated module, so that the optimized target file required when running the application is uploaded.

4.9 Receiving the optimized target file by the machine code integrated module to generate the optimized installation package, and sending a request for adding the optimized installation package to the application management module. This step includes: receiving the request for uploading the optimized file sent from the machine code uploading module by the machine code integrated module, to obtain the optimized target file sent from the machine code uploading module; meanwhile, sending a request for obtaining the application installation package to the application management module, to obtain the original application installation package; subsequently, integrating the optimized target file-target.file into the original application installation package and resigning the original application installation package to obtain the optimized installation package; and sending a request for adding the optimized installation package to the application management module.

4.10 Storing the optimized installation package into the application data list by the application management module. This step includes: receiving the request for adding the optimized installation package sent from the machine code integrated module by the application management module, looking up the application data list to obtain the optimized application installation package list corresponding to the application identification, and then storing the terminal system attribute code and the optimized installation package sent from the machine code integrated module into the optimized application installation package list.

4.11 Completing the installation application task, and turning to step 4.1.

What is claimed is:

1. A method for rapidly deploying an application based on a customized android platform, comprising:

a first step, building a system for rapidly deploying the application based on the customized Android platform, wherein the system is composed of two layers, including a cloud application store running in a cloud server, and an application store client running in a mobile intelligent device;

wherein the cloud application store is unique in a global network and is deployed in the cloud server, and the cloud application store includes an application management module, a machine code integrated module, and an application center database, wherein the cloud application store provides multiple services in parallel to mobile intelligent devices connected to the cloud application store, and the services include downloading the application, downloading an application list, uploading an optimized file required when running the application, wherein the application data list is stored in the application center database, wherein the application data list has P items, wherein the P is the number of applications, wherein each item of the application data list has four fields, including an application identification, an application category identification, an original application installation package, and an optimized application installation package list, wherein the application identification is a unique identification representing the application, the application category identification represents a category of the application, an original APK file is stored in the original application installation package, and the optimized application installation package list is a two-dimensional array, wherein each row of the optimized application installation package list is composed of two items including a terminal system attribute code and an optimized installation package, wherein an APK file optimized by the mobile intelligent device corresponding to the terminal system attribute code is stored in the optimized installation package, wherein the terminal system attribute code is a unique identification of a type of the mobile intelligent device, and a same type of mobile intelligent devices has a same hardware version and a system software version, wherein one application identification corresponds to one optimized application installation package list, wherein each optimized application installation package list has n items, n is the number of types of the mobile intelligent devices connected to the cloud application store, and both the P and the n are positive integers, wherein the application store client runs in each mobile intelligent device, the application store client includes an application acquisition module and a machine code uploading module, wherein the application store client is used to show a list of available applications in the application store client, download the APK file which supports a rapid deployment, and upload an optimized target file of a particular application generated by a native compilation, wherein the application management module is connected to the machine code integrated module, the application acquisition module and the application center database, and the application management module is used to provide the application acquisition module with a downloading application list service and a downloading application service, and also provide the APK file to the machine code integrated module, wherein a request for obtaining the application installation package sent by the machine code integrated module is received by the application management module, wherein a parameter of the request includes the application identification, wherein the original application installation package corresponding to the application identification is obtained by looking up the application data list, and sent back to the machine code integrated module, a request for adding the optimized installation package sent by the machine code integrated module is received by the application management module, wherein parameters of the request include the application identification, the terminal system attribute code, and the optimized installation package, wherein the optimized application installation package list corresponding to the application identification is obtained by looking up the application data list, the terminal system attribute code and the optimized installation package sent by the machine code integrated module are stored into the optimized application installation package list corresponding to the application identification, wherein a request for downloading the application list sent by the application acquisition module is also received by the application management module, wherein a parameter of the request includes the application category identification, wherein all the applications which belong to the application category identification are obtained by looking up the application data list to form an application list including two items, wherein the two items in the application data list include the application identification and the application category identification, wherein the application list is sent back to the application acquisition module, wherein a request for downloading the application sent by the application acquisition module is also received by the application management module, wherein the parameters of the request include the application identification and the terminal system attribute code, wherein the application original package and the optimized application installation package list which are corresponding to the application identification, are obtained by looking up the application data list, and then the optimized application installation package list is looked up to check whether an optimized installation package corresponding to the terminal system attribute code is available, if the optimized installation package is available, the optimized installation package is sent back to the application acquisition module; otherwise if the optimized installation package is unavailable, the original application installation package is sent back to the application acquisition module, wherein the machine code integrated module is connected to the application management module and the machine code upload module, and the machine code integrated module is used to receive the optimized target file and integrate the optimized target file into the original application installation package, so as to generate the optimized installation package corresponding to the specific terminal system, wherein a request for uploading the optimized target file sent by the machine code uploading module is received by the machine code integrated module, to obtain the optimized target file, which is named as target.file, sent by the machine code uploading module, wherein parameters of the request include the application identification, the terminal system attribute code, and the optimized target file, meanwhile a request for obtaining the application package is sent by the machine code integrated module to the application management module, to obtain the original application installation package, wherein a parameter of the request includes the application identification, wherein the optimized target file is integrated into the original application installation package and the installation package is re-signed to obtain the optimized installation package, wherein a request for adding the optimized installation package is sent by the machine code integrated module to the application management module, so as to store the optimized installation package into the application data list, wherein parameters of the request include the application identification, the terminal system attribute code, and the optimized installation package, wherein the process of integrating the optimized target file is a process to store the target.file in the original installation package, wherein in the optimized installation package, the target.file is added behind the resources.arsc, and the optimized installation package is then packed into a zip compression package, wherein the application acquisition module is connected to the application management module and the service process installed, and used to show a list of available applications in the cloud application store, wherein the list of available applications is shown on the mobile intelligent device, and the application acquisition module is also used to download the application installation package specified by a user from the cloud application store and receive touch and mouse event of the user to trigger the process of application installation, wherein a request for downloading the application list is sent by the application acquisition module to the application management module to obtain the application list from the application management module, wherein the parameter of the request includes the application category identification, the application list is shown in the application display list of the mobile intelligent device to provide an interface for the user to download applications, wherein if the user intends to download a certain application, a request for downloading the application is sent by the application acquisition module to the application management module, wherein parameters of the request include the application identification and the terminal system attribute code, wherein after the optimized installation package sent back by the application management module is obtained, the application acquisition module sends a request for installing the application to the service process installed through the built-in PackageInstaller of the Android system, wherein a parameter of the request includes the application installation package, the application installation task is then completed, wherein the machine code uploading module is connected to the machine code integrated module and service process installed, and used to upload the target file compiled by the mobile intelligent device and required when running the application, so that the target file can be shared, wherein the target file is compiled by the mobile intelligent device, wherein a request for uploading the optimized file sent by the installed is received by the machine code uploading module, wherein parameters of the request include the application identification and the optimized target file, wherein after the application identification and the optimized target file is received from the installed, a request for uploading the optimized target file is sent to the machine code integrated module by the machine code uploading module with the terminal system attribute code corresponding to the mobile intelligent device, so as to upload the optimized target file required when running the application, wherein parameters of the request include the application identification, the terminal system attribute code, and the optimized target file, a second step, improving the service process installed of the Android system, wherein the improved service process installed is connected to the application acquisition module and the machine code uploading module, the improved installation package is obtained based on executing the original service process installed, so that a rapid deployment is achieved;

a third step, running the cloud application store, and initializing the application center database, wherein a system administrator logs relevant contents of the application provided for the user into the application data list of the application center database through the application management module, wherein the contents include the application identification, the application category identification, and the original application installation package, wherein as to the optimized application installation package which is compiled according to terminal type and uploaded and packed by the user, the system administrator also stores the optimized application installation packages in the optimized application installation package list through the application management module, wherein the optimized application installation package list corresponds to the application identification, and the optimized application installation package list belongs to application data list;

a fourth step, the mobile intelligent devices deploy applications in parallel, by means of the system for rapidly deploying applications based on the customized Android platform, wherein the fourth step includes:

4.1, if the mobile intelligent devices run normally, downloading the application list provided from the cloud application store regularly, by the application acquisition module according to a method described in step 4.1.1, while receiving the operating instructions from the user according to a method described in step 4.1.2 by the application acquisition module, and operating according to different instructions, 4.1.1, by means of a built-in timer of the Android system, sending a request for downloading the application list to the application management module regularly by the application acquisition module, and displaying the application list obtained from the application management module on the mobile intelligent device to provide a downloading interface of the application for the user, 4.1.2, according to the application list displayed on the mobile intelligent device, receiving the operations of the user from the keyboard or the touch screen by the application acquisition module, wherein if the application installation is needed, then turning to step 4.2, otherwise if no application installation is needed, then turning to the step 4.1.2, 4.2, sending a request for downloading the application to the application management module by the application acquisition module, wherein parameters of the request include the application identification and the terminal system attribute code, 4.3, sending the application installation package to the application acquisition module by the application management module, wherein the step 4.3 includes: receiving the request for downloading the application from the application acquisition module by the application management module, wherein parameters of the request include the application identification and the terminal system attribute code; looking up the application data list to obtain the original application installation package and the optimized installation package list, which both correspond to the application identification; subsequently, looking up the optimized application installation package list to check whether the optimized installation package corresponding to the terminal system attribute code is available; if the optimized installation package is available, sending the optimized installation package back to the application acquisition module, otherwise if the optimized installation package is unavailable, sending the original application installation package to the application acquisition module, 4.4, by means of triggering APK installation action of the PackageInstaller, sending an installation request to the PackgeManager by the application acquisition module, wherein a parameter of the request includes the application installation package to be installed, i.e., the AKP file to be installed, 4.5, sending the installation request to the PackageManagerService in the service layer by the PackgeManager in a binder manner, 4.6, after the installation request is received by PackageManagerService, submitting an installation request to the improved service process installed in a socket internal process communication mode, 4.7, performing the installation and the APK optimization by the improved service process installed, wherein the step 4.7 includes, 4.7.1, executing do_install function, and invoking an install function of the Android system, to complete operations of copying APK files, creating directory use, and modifying a user permission, 4.7.2, executing do_dexopt function, invoking the dexopt function of the Android system to perform APK optimization, and this step includes:

4.7.2.1, calculating a path of the optimized target file to be generated according to the parameters sent from PackageManagerService, 4.7.2.2, creating the optimized target file, and modifying a user permission to obtain a read-write handle of the optimized target file, 4.7.2.3, judging whether the application installation package to be installed sent by the application acquisition module in the step 4.4 is the available optimized installation package, and if yes, turning to step 4.7.2.4, while if not, turning to step 4.7.2.5 to perform the native compilation, 4.7.2.4, performing a rapid installation, including decompressing the application installation package to be installed by the installed to obtain the target.file, and saving the target.file into a designated file through the read-write handle obtained from the step 4.7.2.2, subsequently turning to step 4.11, 4.7.2.5, invoking a built-in executable program dex2oat or dexopt of the Android to perform the APK file optimization, so as to generate the optimized target file to be used for the final execution, and thus the process for installing the application natively is completed, 4.7.3, sending a request for uploading the optimized file to the machine code uploading module by the installed, 4.8, after receiving the request for uploading the optimized file sent from the installed by the machine code uploading module, sending a request for uploading the optimized target file to the machine code integrated module, so that the optimized target file required when running the application is uploaded, 4.9, receiving the optimized target file by the machine code integrated module to generate the optimized installation package, and sending a request for adding the optimized installation package to the application management module, 4.10, storing the optimized installation package into the application data list by the application management module, 4.11, completing the installation application task, and turning to the step 4.1.

2. The method for rapidly deploying an application based on a customized android platform of claim 1, wherein the method of improving the service process installed of the Android system in the second step includes, 2.1, changing an optimized file generation process of the original installed, wherein after creating the optimized target file, changing a permission, and obtaining a read-write handle of the optimized target file, determining whether the APK file to be installed is the available optimized installation package without directly performing the native compilation, if yes, using the APK file to perform a rapid installation, and then ends; if not, invoking an built-in executable program of the Android to optimize the APK file, so as to generate an optimized target file for a final execution;

2.2, changing the application installation ending process of the original installed, wherein after invoking the built-in executable program of the Android to optimize the APK file so as to generate the optimized target file for the final execution, first send a request for uploading the optimized target file to the machine code uploading module, wherein parameters of the request are the application identification and the optimized target file, and then uploading the optimized target file, the installation process subsequently ends.

3. The method for rapidly deploying an application based on a customized android platform of claim 1, wherein the request for downloading the application list to the application management module in the step 4.1.1 is sent every day or every hour, and self-defined by the user according to an energy consumption and a data flow of the mobile intelligent device.

4. The method for rapidly deploying an application based on a customized android platform of claim 1, wherein the step 4.9 of receiving the optimized target file by the machine code integrated module to generate the optimized installation package, and sending a request for adding the optimized installation package to the application management module further includes, receiving the request for uploading the optimized file sent from the machine code uploading module by the machine code integrated module, to obtain the optimized target file sent from the machine code uploading module; meanwhile, sending a request for obtaining the application installation package to the application management module, to obtain the original application installation package; subsequently, integrating the target.file into the original application installation package and resigning the original application installation package to obtain the optimized installation package; and sending a request for adding the optimized installation package to the application management module.

5. The method for rapidly deploying an application based on a customized android platform of claim 1, wherein the step 4.10 of storing the optimized installation package into the application data list by the application management module further includes, receiving the request for adding the optimized installation package sent from the machine code integrated module by the application management module, looking up the application data list to obtain the optimized application installation package list corresponding to the application identification, and then storing the terminal system attribute code and the optimized installation package sent from the machine code integrated module into the optimized application installation package list.

* * * * *